US009122986B2

(12) United States Patent
Yagnik

(10) Patent No.: US 9,122,986 B2
(45) Date of Patent: Sep. 1, 2015

(54) TECHNIQUES FOR UTILIZING AND ADAPTING A PREDICTION MODEL

(71) Applicant: Google Inc., Mountain View, CA (US)

(72) Inventor: Jay N. Yagnik, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 263 days.

(21) Appl. No.: 13/669,073

(22) Filed: Nov. 5, 2012

(65) Prior Publication Data

US 2015/0154493 A1 Jun. 4, 2015

Related U.S. Application Data

(60) Provisional application No. 61/555,813, filed on Nov. 4, 2011.

(51) Int. Cl.
*G06N 5/04* (2006.01)
*G06N 5/02* (2006.01)

(52) U.S. Cl.
CPC .. *G06N 5/02* (2013.01); *G06N 5/04* (2013.01); *G06N 5/046* (2013.01)

(58) Field of Classification Search
None
See application file for complete search history.

(56) References Cited

U.S. PATENT DOCUMENTS 7,860,871 B2 * 12/2010 Ramer et al. .................. 707/751

OTHER PUBLICATIONS

Bloehdorn, Kernel Methods for Knowledge Structures, Doctoral Thesis, Universitaet Karlsruhe, 2008, pp. 1-257.*

Bach, F. et al., "High-Dimensional Non-Linear Variable Selection through Hierarchical Kernel Learning," Technical Report, 2009, 54 pages.

Barreno, M. et al, "Can Machine Learning Be Secure?," ASIACCS'06, Mar. 21-24, 2006, Taipei, Taiwan, 10 pages.

Bartlett, P. et al., "Adaptive Online Gradient Descent," In NIPS 2007, pp. 1-8.

Chang, Y. et al., "Training and Testing Low-degree Polynomial Data Mappings via Linear SVM," Journal of Machine Learning Research, 11 (2010), pp. 1471-1490.

Chechik. G. et al, "Max-margin classification of incomplete data," IJCNN 2003.

Crammer, K. et al., "Adaptive Regularization of Weight Vectors," In NIPS 2009, pp. 1-9.

Crammer, K. et al., "Online Passive-Aggressive Algorithms," Journal of Machine Learning Research 7 (2006) pp. 551-585.

Dekel, O. et al., "Learning to classify with missing and corrupted features," Machine Learning (2010) 81: 149-178.

(Continued)

*Primary Examiner* — Wilbert L Starks
(74) *Attorney, Agent, or Firm* — Remarck Law Group PLC

(57) ABSTRACT

A computer-implemented technique of providing relevant search results to a user of a website at a query time. The technique can include receiving, at a computing device having one or more processors, a query from the user, the query corresponding to a description of potential search results desired by the user. The technique can further include retrieving a user history corresponding to previous user interactions with the website and determining a context of the user corresponding to an interaction of the user with the website at the query time. The relevant search results can be determined based on the query, the user history, and the context of the user and a prediction model, and be provided to the user via updating of a webpage presented to the user. The technique can further include adapting the prediction model based on a prediction event and set of corresponding prediction event features.

20 Claims, 4 Drawing Sheets

100

DEFINE A SET OF FEATURE TEMPLATES OF A PREDICTION MODEL — 104

RECEIVE A PREDICTION EVENT AND A SET OF CORRESPONDING PREDICTION EVENT FEATURES — 108

INCORPORATE THE PREDICTION EVENT AND THE SET OF CORRESPONDING PREDICTION EVENT FEATURES INTO DATA ON WHICH PREDICTION MODEL IS BASED — 112

DETERMINE A POWER SET OF THE SET OF FEATURE TEMPLATES TO OBTAIN A PLURALITY OF COMBINATIONS OF FEATURE TEMPLATES — 116

DETERMINE A TENSOR PRODUCT FOR EACH OF THE PLURALITY OF COMBINATIONS OF FEATURE TEMPLATES TO OBTAIN A TRANSFORMED FEATURE VECTOR SPACE — 120

ARRANGE THE TRANSFORMED FEATURE VECTOR SPACE INTO A PLURALITY OF LAYERS — 124

DETERMINE A WEIGHT VECTOR FOR THE TRANSFORMED FEATURE VECTOR BASED ON A LOSS FUNCTION — 128

(56) References Cited

OTHER PUBLICATIONS

Drezde, M. et al., "Confidence-Weighted Linear Classification," Proceedings of the 25th International Conference on Machine Learning, Helsinki, Finland, 2008, pp. 1-8.

Krause, S. et al., "An Ensemble of Classifiers Approach for the Missing Feature Problem," IEEE, pp. 553-558 (2003).

Lowd, D. et al., "Adversarial Learning," KDD '05 Proceedings of the eleventh ACM SIGKDD international conference on Knowledge discovery in data mining, pp. 641-647 (2005).

McMahan, H. et al., "Adaptive Bound Optimization for Online Convex Optimization," Jul. 2010, arXiv:1002.4908v2, pp. 1-19.

Polikara, R. et al., "Learn++.MF: A random subspace approach for the missing feature problem," Pattern Recognition, vol. 43 (2010) 3817-3832.

Rostamizadeh, A. et al., "Online and Batch Learning Algorithms for Data with Missing Features," arXiv:1104.0729v4, Jun. 2011, 13 pages.

Streeter, M. et al., "Less Regret via Online Conditioning," arXiv:1002.4862v1, Feb. 25, 2010, pp. 1-11.

Zhao, P. et al., "The Composite Absolute Penalties Family for Grouped and Hierarchical Variable Selection," The Annals of Statistics 2009, vol. 37, No. 6A, 3468-3497.

Zinkevich, M., "Online Convex Programming and Generalized Infinitesimal Gradient Ascent," Proceedings of the Twentieth International Conference on Machine Learning (ICML-2003), Washington DC, 2003, 8 pages.

* cited by examiner

TECHNIQUES FOR UTILIZING AND ADAPTING A PREDICTION MODEL

CROSS-REFERENCE TO RELATED APPLICATIONS

This application claims the benefit of U.S. Provisional Application No. 61/555,813, filed on Nov. 4, 2011. The entire disclosure of the above application is incorporated herein by reference.

FIELD

The present disclosure generally relates to adaptation and utilization of prediction models and, more particularly, to techniques for providing efficient prediction models and associated prediction results in a rich feature environment even for sparse prediction events.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Machine learning systems typically utilize a large amount of data organized into features to assist in the generation and adaption of a prediction model. As the number of features increases, the associated model becomes more complex. For prediction events that include only a small number of features typical prediction models may provide inaccurate or otherwise unacceptable prediction results.

The present disclosure provides for the generation, adaptation and utilization of a prediction model to obtain improved performance, for example, in determining prediction results based on prediction events irrespective of the number of features associated therewith.

SUMMARY

In some embodiments of the present disclosure, a computer-implemented technique of providing relevant search results to a user of a website at a query time is disclosed. The technique can include receiving, at a computing device having one or more processors, a query from the user, the query corresponding to a description of potential search results desired by the user. The technique can further include retrieving a user history from a user history datastore, the user history corresponding to previous user interactions with the website. The technique can additionally include determining, at the computing device, a context of the user corresponding to an interaction of the user with the website at the query time. Further, the technique can include determining, at the computing device, the relevant search results based on the query, the user history, and the context of the user and a prediction model. The relevant search results can be provided to the user via updating of a webpage presented to the user.

In some embodiments of the present disclosure, a computer-implemented technique for adapting a prediction model that predicts relevance of content presented to a user is provided. The technique can include defining, at a computing device having one or more processors, a set of feature templates of the prediction model, each of the set of feature templates including one or more features corresponding to attributes of a potential prediction event. The technique can further include receiving, at the computing device, a prediction event and a set of corresponding prediction event features, each of the set of prediction event features corresponding to one of the features. The technique can also include adapting, at the computing device, the prediction model based on the prediction event and the set of corresponding prediction event features by: (i) incorporating the prediction event and the set of corresponding prediction event features into data on which the prediction model is based, (ii) determining a power set of the set of feature templates to obtain a plurality of combinations of feature templates, (iii) determining a tensor product for each of the plurality of combinations of feature templates to obtain a transformed feature vector space, (iv) arranging the transformed feature vector space into a plurality of layers such that, for each layer x corresponding to the tensor product of a specific combination of feature templates that includes y members and a specific member, wherein x and y are integers greater than 0, layer (x+1) corresponds to the tensor product of a specific combination of feature templates that includes more than y members and that includes the specific member, and layer (x−1) corresponds to the tensor product of a specific combination of feature templates that includes less than y members and that includes the specific member, and (iv) determining a weight vector for the transformed feature vector space based on a loss function such that a first weight of the weight vector corresponding to layer x is no greater than a second weight of the weight vector corresponding to layer (x−1), wherein the loss function minimizes error of the prediction model.

In some embodiments of the present disclosure, a computing device that implements a prediction model that predicts relevance of content presented to a user is provided. The computing device can include one or more processors that defines a set of feature templates of the prediction model, each of the set of feature templates including one or more features corresponding to attributes of a potential prediction event. The computing device can further include a model datastore in communication with the one or more processors and that stores the prediction model and a communication module in communication with the one or more processors and that receives a prediction event and a set of corresponding prediction event features, each of the set of prediction event features corresponding to one of the features. Additionally, the computing device can include a model adaption module in communication with the one or more processors and the model datastore. The model adaption module can be configured to adapt the prediction model based on the prediction event and the set of corresponding prediction event features by: (i) incorporating the prediction event and the set of corresponding prediction event features into data on which the prediction model is based, (ii) determining a power set of the set of feature templates to obtain a plurality of combinations of feature templates, (iii) determining a tensor product for each of the plurality of combinations of feature templates to obtain a transformed feature vector space, (iv) arranging the transformed feature vector space into a plurality of layers such that, for each layer x corresponding to the tensor product of a specific combination of feature templates that includes y members and a specific member, wherein x and y are integers greater than 0, layer (x+1) corresponds to the tensor product of a specific combination of feature templates that includes more than y members and that includes the specific member, and layer (x−1) corresponds to the tensor product of a specific combination of feature templates that includes less than y members and that includes the specific member, and (iv) determining a weight vector for the transformed feature vector space based on a loss function such that a first weight of the weight vector corresponding to layer x is no greater than a second weight of the weight vector corresponding to layer (x−1), wherein the loss function minimizes error of the prediction model.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
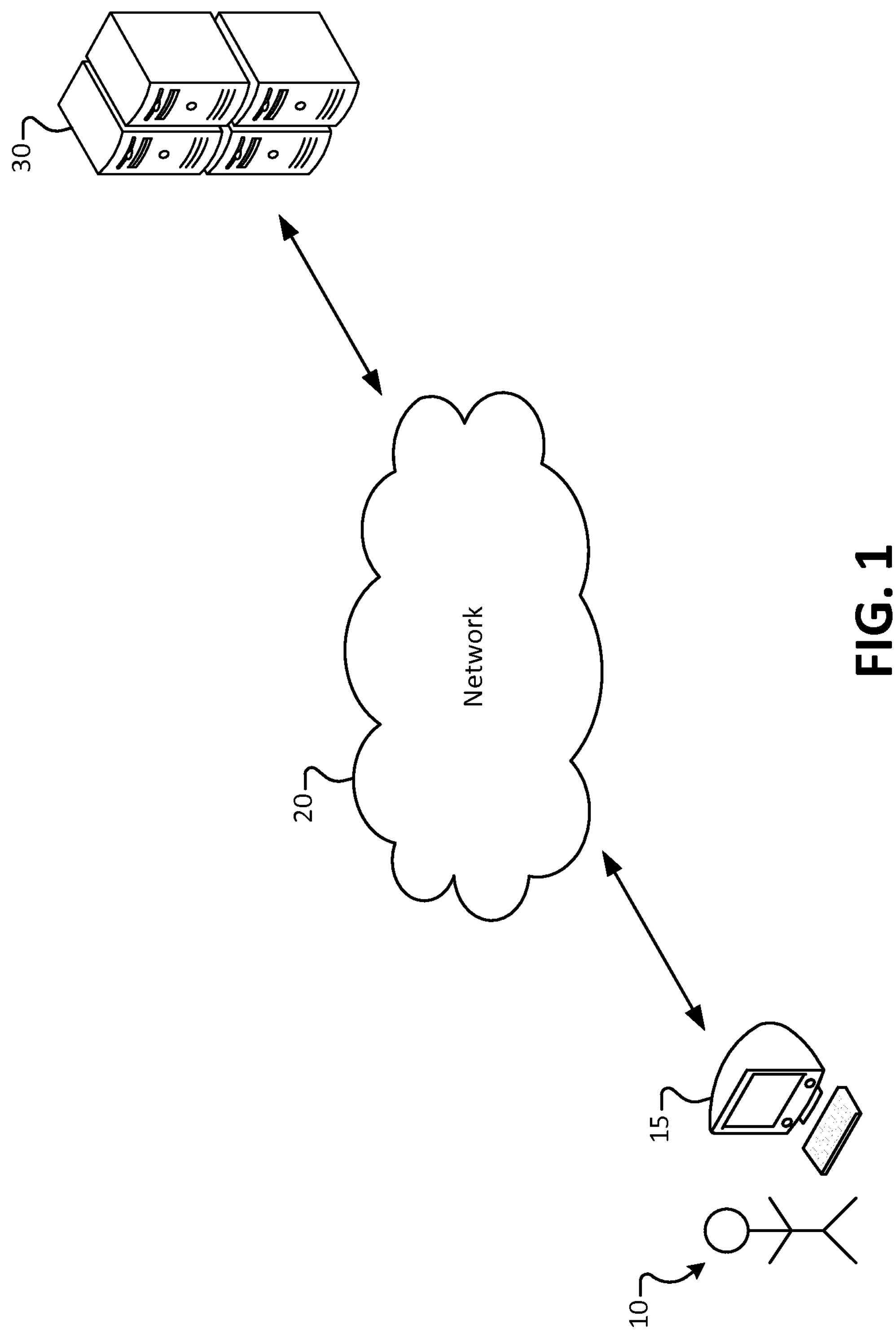
FIG. 1 is an illustration of an example environment of a prediction model according to some embodiments of the present disclosure.

Referring now to FIG. 1, an environment in which the techniques of the present disclosure can be utilized is illustrated. A user 10 can interact with a user computing device 15 to access a network 20. Examples of the network 20 include, but are not limited to, the Internet, a wide area network, a local area network, and a private network. A computing device 30 (shown as a plurality of servers) connected to the network 20 may also be accessed by the user 10 via the user computing device 15. The computing device 30 may include and/or otherwise implement a prediction model, as described herein.

It should be appreciated that the environment shown in FIG. 1 is merely illustrative and different environments (such as those that include more or less components, those that include additional connections, and/or those that are arranged in a different configuration) may be utilized with the present disclosure. Furthermore, while FIG. 1 illustrates a plurality of servers implementing the prediction model disclosed herein, any form of computing device 30 with one or more processors (server, distributed servers, desktop or laptop computer, etc.) can be utilized with the teachings of the present disclosure. For example only, it is contemplated that the teachings of the present disclosure may be implemented by and amongst a plurality of distributed servers. Thus, the term "computing device" 30 used herein includes, but is not limited to, not only an individual computing device, but also a plurality of computing devices operating in concert to perform the techniques described herein.

Figure 2:
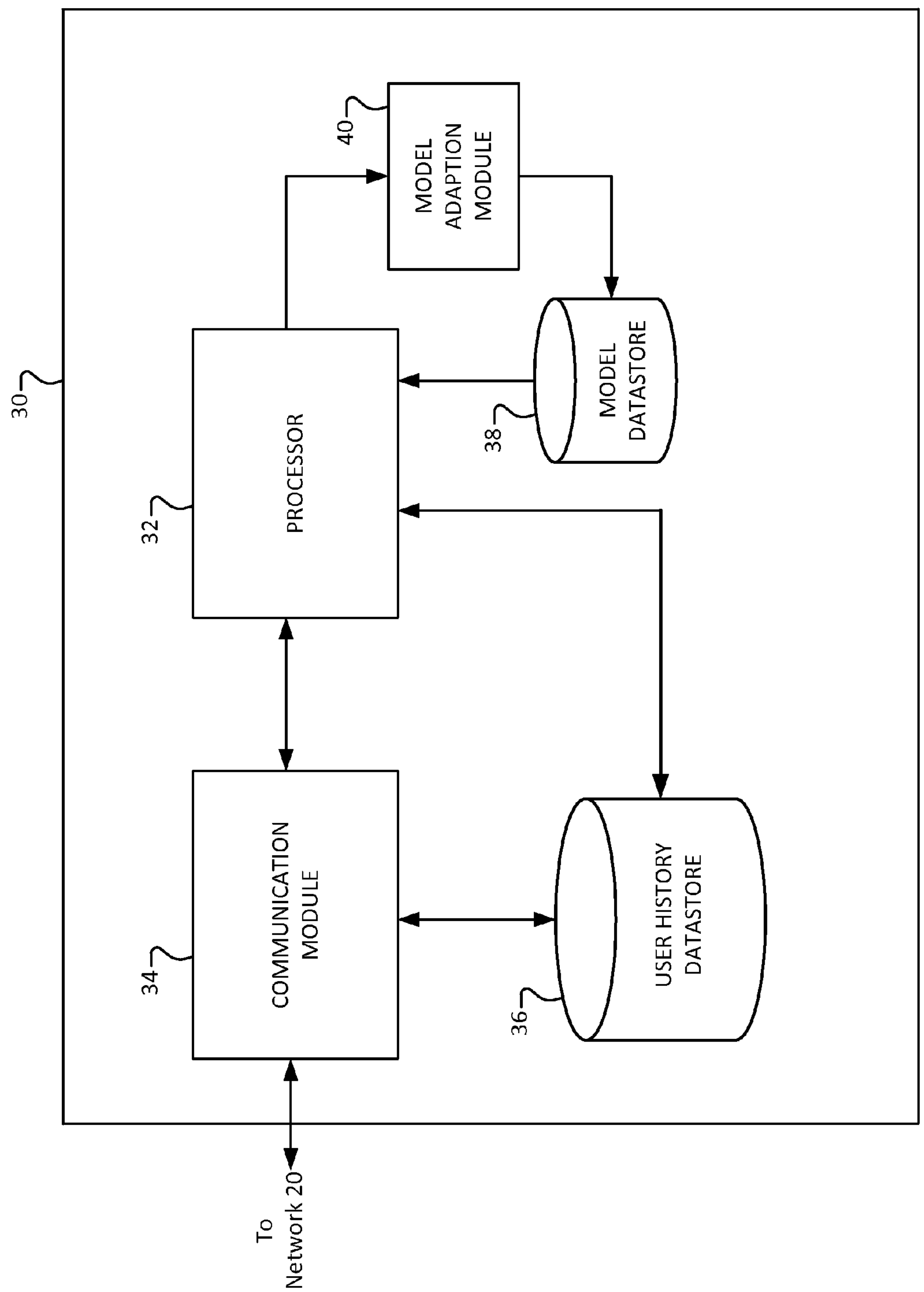
FIG. 2 is a functional block diagram of an example computing device that implements a prediction model according to some embodiments of the present disclosure.

An example computing device 30 that implements a prediction model according to some embodiments of the present disclosure is illustrated in FIG. 2. The computing device 30 can include a processor 32 in communication with a communication module 34. The communication module 34 can provide the communication path between the network 20 and the processor 32. The processor 32 can be configured to control the functionality of the computing device 20 by executing one or more software applications, such as the operating system of the computing device 30. Furthermore, the processor 32 can be configured to interact with some or all of the other components of the computing device 30, such as a user history datastore 36, a model datastore 38 and/or a model adaption module 40 described below. While the communication module 34 and model adaption module 40 are illustrated as separate components from the processor 32, it should be appreciated that these components could be implemented at least in part by the processor 32.

The user 10 can interact with the prediction model implemented at the computing device 30 in a number of ways. For example only, the user 10 can utilize the prediction model to obtain relevant search results in response to a query. The user 10 can submit the query to the computing device 30 by inputting the query at the user computing device 15, which is connected to the computing device 30 through the network 20. The computing device 30 can retrieve the search results relevant to the received query by utilizing the prediction model, e.g., stored in the model datastore 38. Each query submission or other type of retrieval request may be referred to as a "prediction event" in that such an action results in a prediction, based on the prediction model, of relevant results to be presented to the user 10.

Each prediction event can be associated with one or more corresponding prediction event features that can be utilized by the computing device 30 to retrieve a relevant prediction result. For example only, the query submitted by the user 10 can be one or more prediction event features. Additional examples of prediction event features include, but are not limited to, the known history of the user 10 (e.g., stored at the user history datastore 36) and the context of the user 10 at the time of the query ("query time").

In one non-limiting example, the user 10 may interact with a computing device 30 implementing a video search/discovery website that utilizes the prediction model to return relevant videos to the user 10. The user 10 can submit a query to the computing device 10 at a query time and the processor 32 (e.g., via the network 20 and the communication module 34, respectively) to initiate a prediction event. Associated with the prediction event can be a set of prediction event features such as, but not limited to, the query itself, the context of the prediction event (the interaction of the user 10 with the website at the query time, such as the video the user 10 has just finished viewing, the query the user 10 submitted to obtain the most recently viewed video, etc.), and a user history (previous interactions of the user 10 with the website, such as previously viewed videos, known preferences of the user 10, previously submitted queries, etc.). The computing device 30 can utilize the prediction event features as inputs to the prediction model in order to determine video search results relevant to the prediction event. The relevant search results can be presented to the user 10, for example, by updating a webpage associated with the website and providing that webpage to the user 10/user computing device 15.

The user history may be stored by the computing device 30, such as in the user history datastore 36, or can be retrieved from another computing device, such as through the use of "cookies" stored on the user computing device 15. It should be appreciated that the computing device 30 can be configured to collect the user history anonymously in order to maintain the privacy of the user 10. Alternatively or additionally, the user 10 may be required to accept and agree to the use of his or her user history in order for the computing device 30 to store and utilize the user history. For example only, the user 10 may log in to an account associated with the user 10 at the computing device and set certain preferences.

The prediction event features can also be provided to the model adaption module 40 to adapt the prediction model stored in the model datastore 38. As the number of features in the prediction model increases, the accuracy of the predictions (e.g., relevance of the search results) may also increase for prediction events that include a large number of features. Nonetheless, some prediction models that include a large number of possible features may provide poor prediction results for prediction events that include relatively few prediction event features. Thus, the prediction models of the present disclosure can be adapted to be robust to prediction events for which there is a scarcity of prediction event features. That is, the prediction model can be configured to provide accurate prediction results irrespective of the number of prediction event features associated with the prediction event.

According to some embodiments of the present disclosure, a prediction model can be defined. The prediction model may include a set of feature templates. Each feature template can include a plurality of features corresponding to attributes of a potential prediction event. That is, each feature template can be a set of features that may be associated with any possible prediction event. The feature templates can be defined as groups of related features, such as a feature template associated with each of a user history, a context, or a query. It should be appreciated that any number of features can be included in a feature template. In some embodiments, the prediction model can be defined by gathering data regarding the feature(s) associated with previous prediction events and their associated prediction results. In this manner, as additional prediction events and their associated prediction results are obtained this additional data can be added to the data upon which the prediction model is based to adapt the prediction model. The defined prediction model can be stored at the computing device 30, such as in the model datastore 38.

Figure 3:
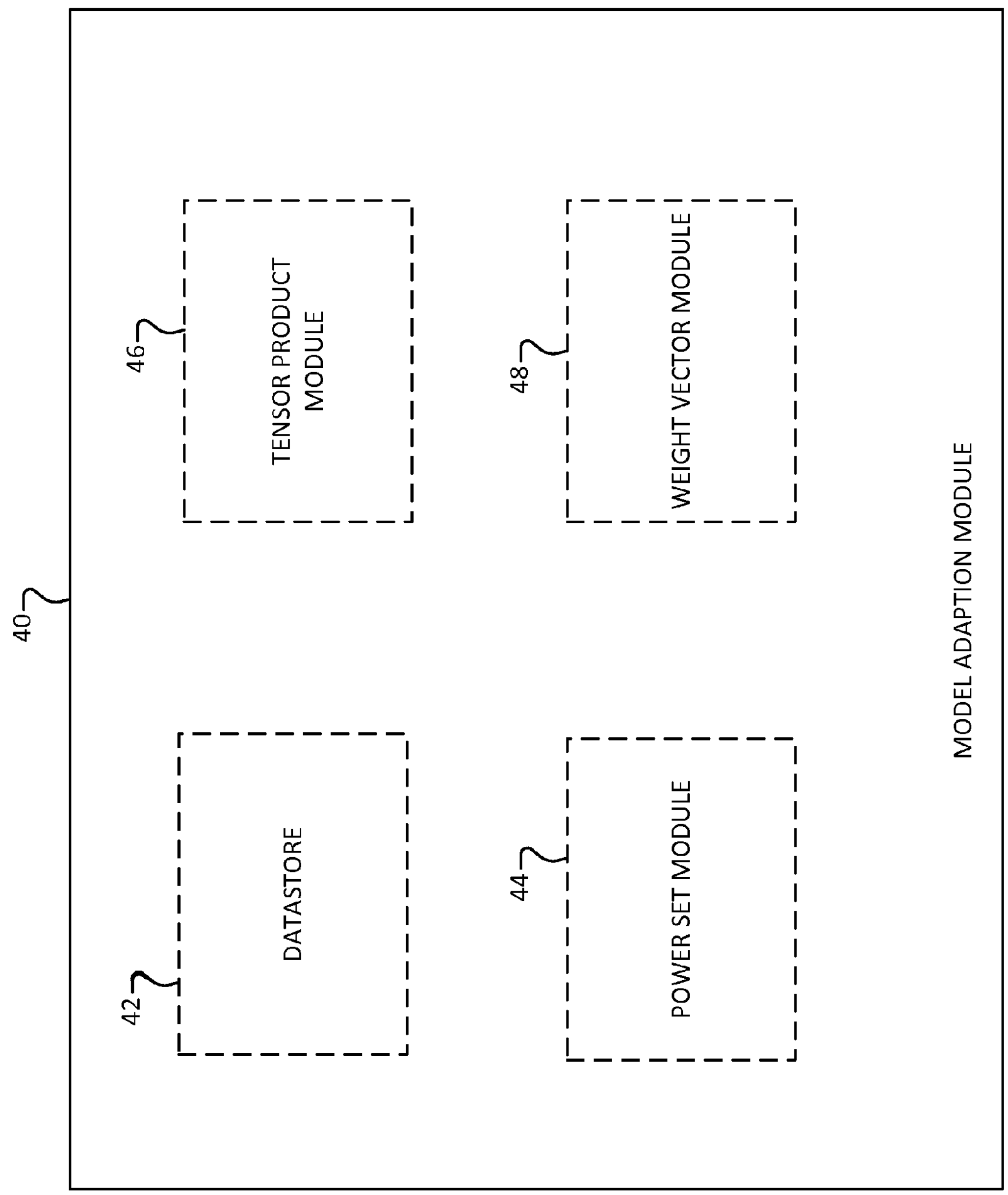
FIG. 3 is a functional block diagram of an example model adaptation module of the computing device shown in FIG. 2.

As mentioned above, the prediction model can be adapted based on one or more prediction events received by the computing device 30. Each prediction event can include an associated set of prediction event features, each prediction event feature corresponding to one of the features of the prediction model. The received prediction event and its associated set of prediction event features can be received by the processor 32 via the communication module 34, and subsequently passed on to the model adaption module 40. The model adaption module 40 can incorporate the prediction event and its associated set of prediction event features into the data on which the prediction model is based, for example, stored at a datastore 42 (FIG. 3) of the model adaption module 40. In this manner, the prediction model of the present disclosure can be particularly well suited for adaptation in an online learning environment in which many prediction events and prediction event features are provided to the computing device 30.

The data, including the prediction event and its associated set of prediction event features, can be provided to the power set module 44 in order to determine a power set of the set of feature templates. The power set of the set of feature templates can correspond to all possible combinations of feature templates. The power set of the feature templates can be provided to the tensor product module 46. The tensor product module 46 can determine a tensor product for each of the members of the power set (each of the plurality of combinations of feature templates) to obtain a transformed feature vector space.

The transformed feature vector space can be arranged into a plurality of layers based on the number of feature templates included. For example, the transformed feature vector space can be arranged into a plurality of layers such that, for each layer x corresponding to the tensor product of a specific combination of feature templates that includes y members and a specific member, wherein x and y are integers greater than 0, layer (x+1) corresponds to the tensor product of a specific combination of feature templates that includes more than y members and that includes the specific member, and layer (x−1) corresponds to the tensor product of a specific combination of feature templates that includes less than y members and that includes the specific member. In the example case where there are three feature template vectors—A, B and C—there can be three corresponding layers. The first layer can include the tensor products of the A vector, B vector and C vector. The second layer can include the tensor products of the A×B vector, the A×C vector and the B×C vector. The third and final layer can include the A×B×C vector.

The weight vector module 48 can determine a weight vector for the transformed feature vector space based on a loss function that minimizes error of the prediction model. The weight vector can be determined such that a first weight of the weight vector corresponding to layer x is no greater than a second weight of the weight vector corresponding to layer (x−1) for all x. To continue with the example above regarding the three feature template vectors A, B and C, the weight vector can be determined such that the weight for feature template vector A is greater than or equal to each of the weights for vectors A×B and A×C. Similarly, the weight vector can be determined such that the weight for feature template vector A×B is greater than or equal to the weights for vectors A×B×C. In this manner, the adaption of the prediction model will provide a higher penalty for more complex vectors than for simpler vectors.

In some embodiments of the present disclosure, the complete set of feature templates can be denoted by:

$$\Phi=\{f_1, f_2, \ldots f_i\},$$

where Φ is the set of all feature templates and $f_1$ is the $i^{th}$ feature template. Similarly, the power set of the set of all feature templates can be denoted by so $\wp(\Phi)$. In these embodiments, the tensor product for each of the plurality of combinations of feature templates to obtain the transformed feature vector space is based on the equation:

$$x_{fp_i}=\bigotimes_{k\in\wp_i(\Phi)} x_{f_k},$$

where $\wp_i(\Phi)$ is an $i^{th}$ element of the power set of the set of feature templates, $x_{f_k}$ is a $k^{th}$ element of the set of feature templates, and $x_{fp_i}$ is an element in the transformed feature vector space corresponding to the $i^{th}$ element of the power set. Furthermore, the loss function can be based on the equation:

$$l(w;(x,y))=\max(0,1-y(w\cdot x)),$$

where w is the weight vector, y is a ground truth label, and x is the transformed feature vector space.

In order to obtain the appropriate weight vector w, an optimization objective can be defined. In some embodiments, as described above, the optimization objective is to minimize the loss for each element in the transformed vector space. For example only, the optimization objective can be based on the equations:

$$\min \Sigma_i |D(w_{fp_i})|\infty$$

$$s.t\ l_{\wp_i(\Phi)}=0\quad 0<i<|\wp(\Phi)|$$

where $D(w_{fp_i})=[w_{fp_i}, w_{fp_j}]\forall j \wp_i(\Phi)\subset\wp_j(\Phi)$ and where $w_{fp_i}$ is elements in the weight vector corresponding to $x_{fp_i}$ and D is a regularization function. In this formulation, gradient computation can be done in layers (as described above) based on the equation:

$$g_{fp_i} = \begin{cases} 0 & \forall\ j\wp_i(\Phi) \subset \wp_j(\Phi) l \wp_j(\Phi) = 0 \\ x_{fp_i} & \text{otherwise} \end{cases},$$

where $x_{fp_i}$ is an element in the transformed feature vector space corresponding to the $i^{th}$ element of the power set and $g_{fp_i}$ is the gradient corresponding to the $i^{th}$ element of the power set.

Figure 4:
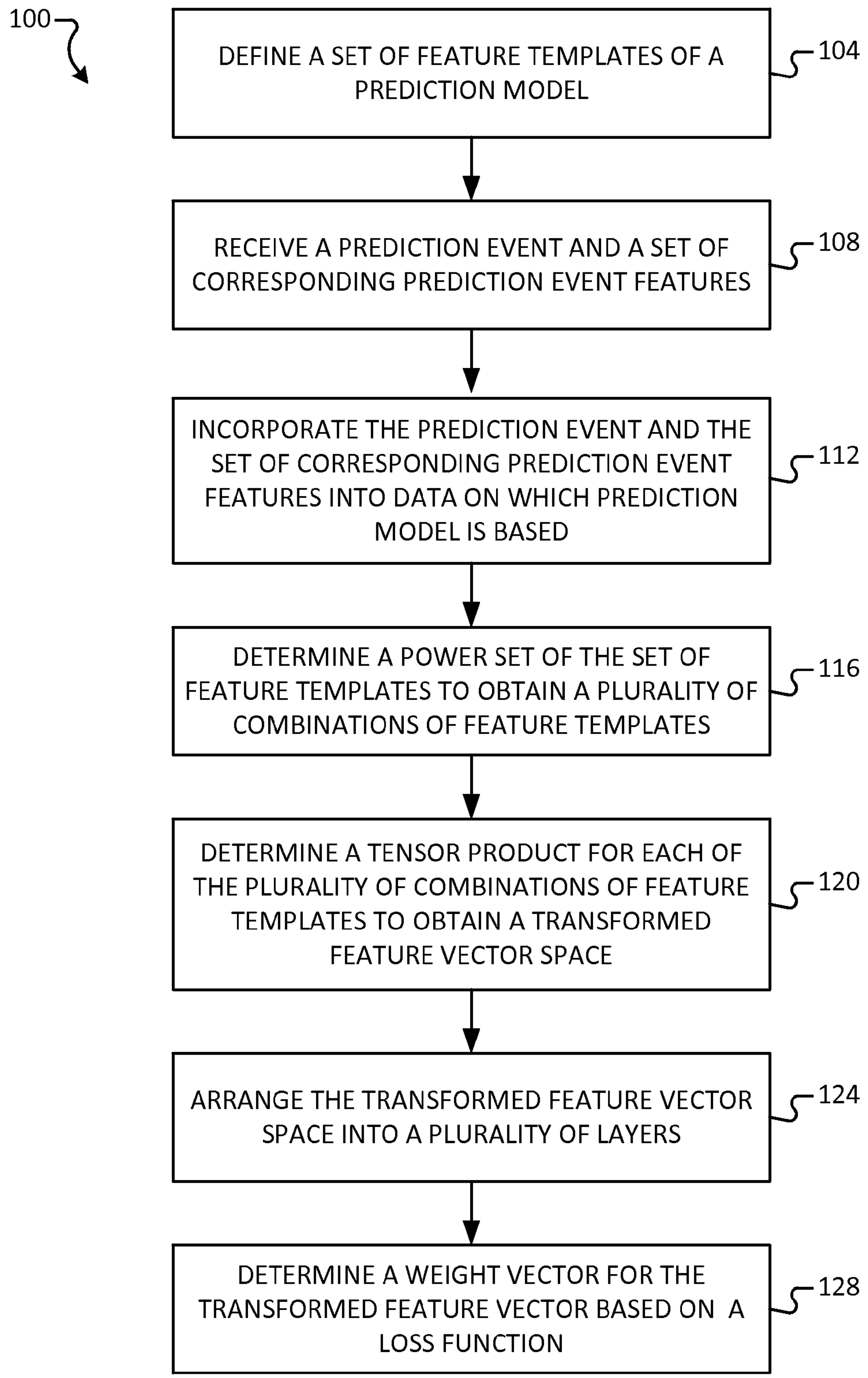
FIG. 4 is a flow chart illustrating an example technique of adapting a prediction model according to some embodiments of the present disclosure.

Referring now to FIG. 4, an example technique 100 of adapting a prediction model according to some embodiments of the present disclosure. At 104, a set of feature templates of the prediction model are defined, e.g., by the computing device 30. As mentioned above, each of the set of feature templates can include one or more features corresponding to attributes of a potential prediction event. At 108, the computing device 30 can receive a prediction event and a set of corresponding prediction event features. An example of a prediction event is the submission of a query, and examples of the prediction event features include, but are not limited to, the query, a user history and a context of the user. Further, each of the set of prediction event features corresponding to one of the features of the prediction model.

The computing device 30 can incorporate the prediction event and the set of corresponding prediction event features into data on which the prediction model is based at 112. The computing device 30 (e.g., at the model adaption module 40) can further determine a power set of the set of feature templates to obtain a plurality of combinations of feature templates at 116. A tensor product for each of the plurality of combinations of feature templates can be determined by the computing device 30 at 120 in order to obtain a transformed feature vector space. The transformed feature vector space can be arranged, by the computing device 30 for example, into a plurality of layers at 124. The plurality of layers can be determined as described above. At 128, the computing device 30 can determine a weight vector for the transformed feature vector space based on a loss function such that a first weight of the weight vector corresponding to layer x is no greater than a second weight of the weight vector corresponding to layer (x−1), wherein the loss function minimizes error of the prediction model.

In some embodiments, the prediction model can be adapted to and utilized to perform multi-task learning and prediction. For example only, as described above, the prediction model can be utilized to predict relevant search results based on a query, a user history and a context. In a multi-task learning environment, the prediction model could also provide a prediction of a user history based on a query, a context and a confirmation of a relevant search result (such as by a selection by the user 10 of a specific search result). In this manner, the prediction model can be utilized to predict any absent feature template(s) given one or more features in a prediction event. Similarly, the prediction model can be adapted based on any number of feature templates present in a prediction event, even in sparse prediction events (those with only a small number of associated feature templates).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of providing relevant search results to a user of a website at a query time, comprising:

receiving, at a computing device having one or more processors, a query from the user, the query corresponding to a description of potential search results desired by the user;

retrieving a user history from a user history datastore, the user history corresponding to previous user interactions with the website;

determining, at the computing device, a context of the user, the context corresponding to an interaction of the user with the website at the query time;

determining, at the computing device, the relevant search results based on the query, the user history, and the context of the user and a prediction model, wherein the prediction model includes a set of feature templates, each of the set of feature templates including one or more features corresponding to attributes of a potential prediction event; and providing, from the computing device, the relevant search results to the user via updating of a webpage presented to the user, wherein the prediction model has been adapted based on a received prediction event and a set of corresponding prediction event features, each of the set of prediction event features corresponding to one of the features, by:

incorporating the prediction event and the set of corresponding prediction event features into data on which the prediction model is based;

determining a power set of the set of feature templates to obtain a plurality of combinations of feature templates;

determining a tensor product for each of the plurality of combinations of feature templates to obtain a transformed feature vector space;

arranging the transformed feature vector space into a plurality of layers such that, for each layer x corresponding to the tensor product of a specific combination of feature templates that includes v members and a specific member, wherein x and y are integers greater than 0, layer (x+1) corresponds to the tensor product of a specific combination of feature templates that includes more than y members and that includes the specific member, and layer (x−1) corresponds to the tensor product of a specific combination of feature templates that includes less than y members and that includes the specific member; and determining a weight vector for the transformed feature vector space based on a loss function such that a first weight of the weight vector corresponding to layer x is no greater than a second weight of the weight vector corresponding to layer (x−1), wherein the loss function minimizes error of the prediction model.

2. The method of claim 1, wherein the website is a video search website.

3. The method of claim 2, wherein the user history includes at least one of previously viewed videos by the user, known preferences of the user, and previously submitted queries by the user.

4. The method of claim 3, wherein the context of the user includes at least one of a video the user has most recently viewed and a query the user submitted to obtain the most recently viewed video.

5. The method of claim 2, wherein: (i) the user history includes at least one of previously viewed documents by the user, known preferences of the user, and previously submitted queries by the user, and (ii) the context of the user includes at least one of a document the user has most recently viewed and a query the user submitted to obtain the most recently viewed document.

6. The method of claim 1, further comprising;

receiving the received prediction event; and adapting the prediction model based on the received prediction event and the set of corresponding prediction event features.

7. The method of claim 1, wherein determining the tensor product for each of the plurality of combinations of feature templates to obtain the transformed feature vector space is based on the equation:

$$x_{fp_i} = \otimes_{k \in \wp_i(\Phi)} x_{fk},$$

where $\wp_i(\Phi)$ is an $i^{th}$ element of the power set of the set of feature templates, $x_{f_k}$ is a $k^{th}$ element of the set of feature templates, and $x_{fp_i}$ is an element in the transformed feature vector space corresponding to the $i^{th}$ element of the power set.

8. The method of claim 7, wherein the loss function is based on the equation:

$$l(w;(x,y)) = \max(0, 1 - y(w \cdot x)),$$

where w is the weight vector, y is a ground truth label, and x is the transformed feature vector space.

9. The method of claim 8, wherein the weight vector is determined based on the equation:

$$\min \Sigma_i |D(w_{fp_i})|_\infty$$

$$s.t\ l_{\wp_i(\Phi)} = 0\ 0 < i < |\wp(\Phi)|$$

where $D(w_{fp_i}) = [w_{fp_i}, w_{fp_i}] \forall j\, \wp_i(\Phi) \subset \wp_j(\Phi)$, $w_{fp_i}$ is an element in the weight vector corresponding to $x_{fp_i}$, and D is a regularization function.

10. The method of claim 1, wherein the website is a document search website.

11. A computer-implemented method for adapting a prediction model that predicts relevance of content presented to a user, the method comprising:

defining, at a computing device having one or more processors, a set of feature templates of the prediction model, each of the set of feature templates including one or more features corresponding to attributes of a potential prediction event;

receiving, at the computing device, a prediction event and a set of corresponding prediction event features, each of the set of prediction event features corresponding to one of the features; and adapting, at the computing device, the prediction model based on the prediction event and the set of corresponding prediction event features by:

(i) incorporating the prediction event and the set of corresponding prediction event features into data on which the prediction model is based, (ii) determining a power set of the set of feature templates to obtain a plurality of combinations of feature templates, (iii) determining a tensor product for each of the plurality of combinations of feature templates to obtain a transformed feature vector space, (iv) arranging the transformed feature vector space into a plurality of layers such that, for each layer x corresponding to the tensor product of a specific combination of feature templates that includes y members and a specific member, wherein x and y are integers greater than 0, layer (x+1) corresponds to the tensor product of a specific combination of feature templates that includes more than y members and that includes the specific member, and layer (x−1) corresponds to the tensor product of a specific combination of feature templates that includes less than y members and that includes the specific member, and (iv) determining a weight vector for the transformed feature vector space based on a loss function such that a first weight of the weight vector corresponding to layer x is no greater than a second weight of the weight vector corresponding to layer (x−1), wherein the loss function minimizes error of the prediction model.

12. The method of claim 11, wherein determining the tensor product for each of the plurality of combinations of feature templates to obtain the transformed feature vector space is based on the equation:

$$x_{fp_i} = \otimes_{k \in \wp_i(\Phi)} x_{fk},$$

where $\wp(\Phi)$ is an $i^{th}$ element of the power set of the set of feature templates, $x_{f_k}$ is a $k^{th}$ element of the set of feature templates, and $x_{fp_i}$ is an element in the transformed feature vector space corresponding to the $i^{th}$ element of the power set.

13. The method of claim 12, wherein the loss function is based on the equation:

$$l(w;(x,y)) = \max(0, 1 - y(w \cdot x)),$$

where w is the weight vector, y is a ground truth label, and x is the transformed feature vector space.

14. The method of claim 13, wherein the weight vector is determined based on the equation:

$$\min \Sigma_i |D(w_{fp_i})|_\infty$$

$$s.t\ l_{\wp_i(\Phi)} = 0\ 0 < i < |\wp(\Phi)|$$

where $D(w_{fp_i}) = [w_{fp_i}, w_{fp_i}] \forall j \otimes_{k \in \wp_i}{}_i(\Phi) \subset \wp_j(\Phi)$, $w_{fp_i}$ is an element in the weight vector corresponding to $x_{fp_i}$, and D is a regularization function.

15. The method of claim 11, further comprising utilizing the adapted prediction model to provide relevant search results to a user.

16. A computing device that implements a prediction model that predicts relevance of content presented to a user, the computing device comprising:

one or more processors that defines a set of feature templates of the prediction model, each of the set of feature templates including one or more features corresponding to attributes of a potential prediction event;

a model datastore in communication with the one or more processors and that stores the prediction model;

a communication module in communication with the one or more processors and that receives a prediction event and a set of corresponding prediction event features, each of the set of prediction event features corresponding to one of the features; and a model adaption module in communication with the one or more processors and the model datastore, the model adaption module configured to adapt the prediction model based on the prediction event and the set of corresponding prediction event features by:

(i) incorporating the prediction event and the set of corresponding prediction event features into data on which the prediction model is based, (ii) determining a power set of the set of feature templates to obtain a plurality of combinations of feature templates, (iii) determining a tensor product for each of the plurality of combinations of feature templates to obtain a transformed feature vector space, (iv) arranging the transformed feature vector space into a plurality of layers such that, for each layer x corresponding to the tensor product of a specific combination of feature templates that includes y members and a specific member, wherein x and y are integers greater than 0, layer (x+1) corresponds to the tensor product of a specific combination of feature templates that includes more than y members and that includes the specific member, and layer (x−1) corresponds to the tensor product of a specific combination of feature templates that includes less than y members and that includes the specific member, and (iv) determining a weight vector for the transformed feature vector space based on a loss function such that a first weight of the weight vector corresponding to layer x is no greater than a second weight of the weight vector corresponding to layer (x−1), wherein the loss function minimizes error of the prediction model.

17. The computing device of claim 16, wherein determining the tensor product for each of the plurality of combinations of feature templates to obtain the transformed feature vector space is based on the equation:

$$x_{fp_i} = \bigotimes_{k \in \wp_i(\Phi)} x_{fk},$$

where $\wp(\Phi)$ is an $i^{th}$ element of the power set of the set of feature templates, $x_{fk}$ is a $k^{th}$ element of the set of feature templates, and $x_{fp_i}$ is an element in the transformed feature vector space corresponding to the $i^{th}$ element of the power set.

18. The computing device of claim 17, wherein the loss function is based on the equation:

$$l(w;(x,y)) = \max(0, 1 - y(w \cdot x)),$$

where w is the weight vector, y is a ground truth label, and x is the transformed feature vector space.

19. The computing device of claim 18, wherein the weight vector is determined based on the equation:

$$\min \Sigma_i |D(w_{fp_i})|\infty$$

$$s.t\ l_{\wp_i(\Phi)} = 0\ 0 < i < |\wp(\Phi)|$$

where $D(w_{fp_i}) = [w_{fp_i}, w_{fp_i}] \forall j \wp_i(\Phi) \subset \wp_j(\Phi)$, $w_{fpi}$ is an element in the weight vector corresponding to $x_{fp_i}$, and D is a regularization function.

20. The computing device of claim 16, wherein the computing device is configured to utilize the adapted prediction model to provide relevant search results to a user.

* * * * *